(12) United States Patent
Athanasiou

(10) Patent No.: US 8,317,214 B2
(45) Date of Patent: Nov. 27, 2012

(54) SHOCK AND VIBRATION DAMPING HANDLEBAR MOUNTING ASSEMBLY

(76) Inventor: George John Athanasiou, Lodi, CA (US)

( * ) Notice: Subject to any disclaimer, the term of this patent is extended or adjusted under 35 U.S.C. 154(b) by 373 days.

(21) Appl. No.: 12/798,200

(22) Filed: Mar. 30, 2010

(65) Prior Publication Data
US 2011/0239814 A1   Oct. 6, 2011

(51) Int. Cl.
*B62K 19/32* (2006.01)
(52) U.S. Cl. ......................... 280/276; 280/279
(58) Field of Classification Search .................. 280/276, 280/279, 280, 283, 275; 74/551.2, 551.1, 74/551.3, 551.4
See application file for complete search history.

(56) References Cited

U.S. PATENT DOCUMENTS

| | | | |
|---|---|---|---|
| 583,483 A | 6/1897 | Kellogg | |
| 1,060,442 A | 4/1913 | Erickson | |
| 1,211,303 A | 1/1917 | Eckel | |
| 2,324,403 A | 7/1943 | Kuhn | |
| 2,583,947 A | 1/1952 | Keetch | |
| 5,188,074 A | 2/1993 | Arnold | |
| 5,511,444 A | 4/1996 | Clausen et al. | |
| 5,678,457 A | 10/1997 | Hals | |
| 5,752,711 A * | 5/1998 | Moreau | 280/276 |
| 6,035,741 A * | 3/2000 | Krizman, Jr. | 74/551.8 |
| 6,953,201 B1 | 10/2005 | VanDeMortel | |
| 6,988,740 B2 | 1/2006 | Bobrovniczky | |
| 7,018,126 B2 | 3/2006 | Henricksen | |
| 7,997,162 B1 * | 8/2011 | Gillis | 74/551.8 |
| 8,029,011 B2 * | 10/2011 | King et al. | 280/279 |
| 2004/0112168 A1 * | 6/2004 | Alley | 74/551.8 |
| 2005/0199090 A1 * | 9/2005 | Renshaw | 74/551.1 |
| 2007/0068331 A1 * | 3/2007 | Cutsforth | 74/551.3 |
| 2010/0213684 A1 * | 8/2010 | D'Aluisio | 280/279 |

\* cited by examiner

Primary Examiner — Tashiana Adams

(57) ABSTRACT

A shock and vibration damping handlebar mounting assembly, for vehicles that utilizes handlebar assisted steering, where the handlebar and its clamping components are suspended by shock and vibration damping springs and materials. The suspended components are allowed to travel along a guide, in a predetermined beneficial path, while maintaining the rider preferred handlebar angles, as the vehicle encounters shock due to rough terrain. Springs dampen the motion of the suspended components reducing the effects of the rough terrain to the rider's hands. The suspended components are isolated from the vehicle's steering mechanism by isolation components made of deadening materials thus reducing the transfer of vibration from the vehicle to the rider's hands.

18 Claims, 17 Drawing Sheets

SHOCK AND VIBRATION DAMPING HANDLEBAR MOUNTING ASSEMBLY

BACKGROUND

1. Field of this Embodiment

The present embodiment relates generally to an assembly for attaching handlebars to the steering mechanism of vehicles that use a handlebar for the purpose of steering; such as but not limited to all-terrain vehicles, motorcycles, snowmobiles, or personal watercraft. More specifically, the current embodiment relates the damping of shock and vibration by a handlebar mounting assembly.

2. Prior Art

The earliest bicycles utilized handlebars mounted directly to the steering mechanism of the vehicle with no means of damping shock or vibration. Soon after these early vehicles were introduced the need for damping the shock and/or vibration before the rider's hands was realized. The most common approach to damping the shock caused by rocks, roots, ruts, potholes, or rough terrain in general, beyond suspending the wheels, was the pivoting of the handlebar's clamp about a fixed pin while using a spring to help dampen impacts. These systems provided insufficient vibration isolation and offered no shock damping along the plane that the force was applied or other beneficial plane, or arc larger than the handlebar clamping assembly itself. Other systems have provided some isolation of vibration but lack the handlebar travel needed to adequately reduce impacts transferred to the rider when rough terrain was encountered. Due to the lack of shock absorption along the axis of rotation of the vehicle's steering, the prior art allows forces, applied for the purpose of steering, to be at least partially absorbed in the handlebar shock absorption mechanism, therefore creating less accurate steering.

A. A. Kellogg U.S. Pat. No. 583,483 teaches of a pivoting handlebar clamp and a compression spring intended to relieve the hands of the rider of a bicycle from the effects of jars and shocks communicated to the handlebar. Similar pivoting bicycle handlebar clamps are disclosed in U.S. Pat. No. 1,060,442 by E. Erickson also by E. K. Kuhn in U.S. Pat. No. 2,324,403 also John R. Arnold in U.S. Pat. No. 5,186,074. Richard Orin Trachinski U.S. PAP Pub. No. US 2005/0066766A1 discloses a similar handle bar mount to Kellogg's for motorcycles, ATV's, and bicycles. These embodiments only provide shock absorption in a rotational manner where the maximum size of the radius of this rotational shock absorption is limited to the physical length of the handlebar clamp mechanism. Most of today's modern handlebars have a rise and compound angles; many riders are very discerning about these angles. A major drawback to this earlier art lies in the rotational absorption of energy about the fixed fulcrum with an extremely limited radius where the energy transmitted as a vehicle's front wheel or wheels contact an obstruction is linear. These linear forces cause a rotation of the handlebars therefore causing the handlebar angles, relative to the vehicle's frame, to change. The changes to the rider preferred handlebar angles may create an uncomfortable or even dangerous situation for the rider. A further drawback to this earlier art is the lack of vibration damping; vibration is a known cause of rider fatigue, this prior art fails to adequately isolate the vibration transmitted through the vehicle's frame to the handlebars and to the rider.

Eivind Clausen and James D. Allsop U.S. Pat. No. 5,511,444 teach of a bicycle handlebar assembly with upper and lower linkage members that are parallel and spaced apart and are pivotally attached at their ends. A damping element is disposed against one of the linkage members for slowing the downward movement of the linkage members. This disclosure allows an arcing motion of the handlebars while the handlebar's angle, relative to the frame, is not greatly altered through this arcing motion. While solving this major drawback of the earlier art, this disclosure in the same way as the before mentioned disclosures, only provides shock absorption in a rotational manner with a radius length that is limited to the physical length of the mechanism and also lacks adequate isolation of the vibration transmitted through the vehicle's frame to the handlebars and to the rider.

Cato Hals, Oslo, Norway U.S. Pat. No. 5,678,457 discloses an adjustable handlebar stem where a built-in shock absorber comprising upper and lower profile arms with 4 pivot points; this allows a pivoting shock absorbing motion as a parallelogram allowing an arcing motion of the handlebars while the bar's angle, relative to the frame, is not greatly altered through the arcing travel. This is very similar to the Eivind Clausen and James D. Allsop disclosure, and similarly only provides shock absorption in a rotational manner with a radius length that is limited to the physical length of the mechanism. Hals' disclosure realizes the same shortcomings as the forces transmitted to the handlebars when a vehicle encounters rough terrain are not in the rotational manner.

Rob William Henricksen U.S. Pat. No. 7,018,126 B2 discloses a Multi-Post Shock Absorber Clamp System. This disclosure, like the dual post shock absorber clamp system that has been widely implemented for many years, offers isolation between the triple clamp (the steering mechanism) and the handlebar by compressing upper and lower urethane conicals between the two components. Denis R. VanDeMortel U.S. Pat. No. 6,953,201 B1 discloses the use of isolation strips to isolate the triple clamps from the handlebars. Henricksen and VanDeMortel's previous art does not teach the use of multiple damping materials to dampen multiple vibration frequencies. Therefore these disclosures will only dampen the frequencies that the chosen material can deaden, and will allow all other frequencies to pass, greatly limiting the vibration damping of these embodiments. Furthermore, Henricksen and VanDeMortel's disclosures do not allow for directional travel for the purpose of absorbing shock. By design these systems must have the isolation materials under high compression to allow the vehicle's handlebars to be turned without the increased handlebar leverage on the isolation material causing the isolation material to compress and cause extremely inaccurate steering, therefore causing the highly compressed isolation material to have greatly limited shock absorbing quality and lack the ability to absorb shock along a preferred axis or plane.

W. A. Keetch U.S. Pat. No. 2,583,947 prior art of a motorcycle handlebar which mounts in the same general direction as the fork where the handlebars of the day which came back toward the rider allowing the handlebars to have a rotational shock absorbing motion without the use of a pivot pin. A major drawback to this earlier art lies in the rotational absorption of energy about a fulcrum with an extremely limited radius where the energy to be absorbed is transmitted linearly as a vehicle's front wheel or wheels contact an obstruction in its path. These linear forces cause a rotation of the handlebars therefore causing the handlebar angles, relative to the vehicle's frame, to change. The changes to the rider preferred handlebar angles may create an uncomfortable or even dangerous situation for the rider.

Guy E. Eckel U.S. Pat. No. 1,211,303 disclose a bicycle attachment where two springs provide shock absorption in a linear direction to a block that holds the handlebar. By using the inner walls of the housing to guide the handlebar block, the offset of the handlebars back toward the rider creates torque between the block and the housing. As the rider's hands pushes or pulls on the handlebar, the handlebar acts like a wrench on the block, twisting the block in the housing rather than allowing the block to slide in the housing. This handlebar block torque causes the sticking of the block in the housing therefore causing the entire handle bar mounting assembly to bend and flex. The stuck block will jump and then re-stick as torque force changes direction due to the rider's hands pushing or pulling on the handlebar. The stick and jump effect of Eckel's embodiment is an undesirable affect to a rider and the reason that devices of this nature are not in use. Furthermore the lack of damping in the upward direction causes an abrupt stop of the bars when the spring force pushes the bars in the upward direction, and lacks isolation of the handlebars to dampen vibration.

Bret Bobrovniczky U.S. Pat. No. 6,988,740 discloses a suspension for bicycle seat and handlebar support between a support post of a bicycle and a suspended member such as a bicycle seat and bicycle handlebars, having an invertible connector body with support post mounting. Bobrovniczky's embodiment, having downwardly extending slide pins that would hinder the steering of a vehicle employing a triple clamp steering component or a steering stem and a post mounting design, renders this embodiment nonfunctional for motorcycles, ATV's, snowmobiles, or other vehicles with the before mentioned steering components. In Bobrovniczky's embodiment, forces applied to the handlebars for the purpose of steering or rough terrain causing rotation about the steering axis, exerts force on the slide pins by the support bracket causing the bending of the levered slide pin. In order to counter this effect extremely large and heavy slide pins must be used adding unwanted weight to the vehicle. Additionally the lack of damping in the upward direction causes an abrupt stop of the bars when the spring force pushes the bars in the upward direction. Furthermore, this embodiment does not provide isolation of the handlebars for the purpose of damping vibration.

There have been attempts to provide shock damping handlebar assemblies to minimize the shock realized by the rider of vehicles that employ handlebar assisted steering. These assemblies have typically comprised a pivoting linkage. A disadvantage to these types of assemblies is that they subject the rider's wrist to a twisting force as the bars pivot about the assembly's fulcrum. The few slidably controlled embodiments lack the ability to be used by vehicle's having a triple clamp or a steering stem, the two most common methods for transferring handlebar assisted steering forces of vehicles other than the conventional bicycle, or the design to allow travel of the handlebar in a predetermined beneficial path. Furthermore, the prior art lacks the vibration isolation of its suspended components, a known cause of rider fatigue.

SUMMARY OF THIS EMBODIMENT

It is the objective of one or more of the embodiments to provide a light weight shock and vibration damping handlebar mounting assembly which is capable of damping the effects of rough terrain and other vehicle vibrations between the vehicle's steering mechanism and the handlebars.

DRAWINGS—FIGURES

In the drawings, closely related figures have the same number but different alphabetic suffixes.

DRAWING—REFERENCE NUMERALS

Figure 1:
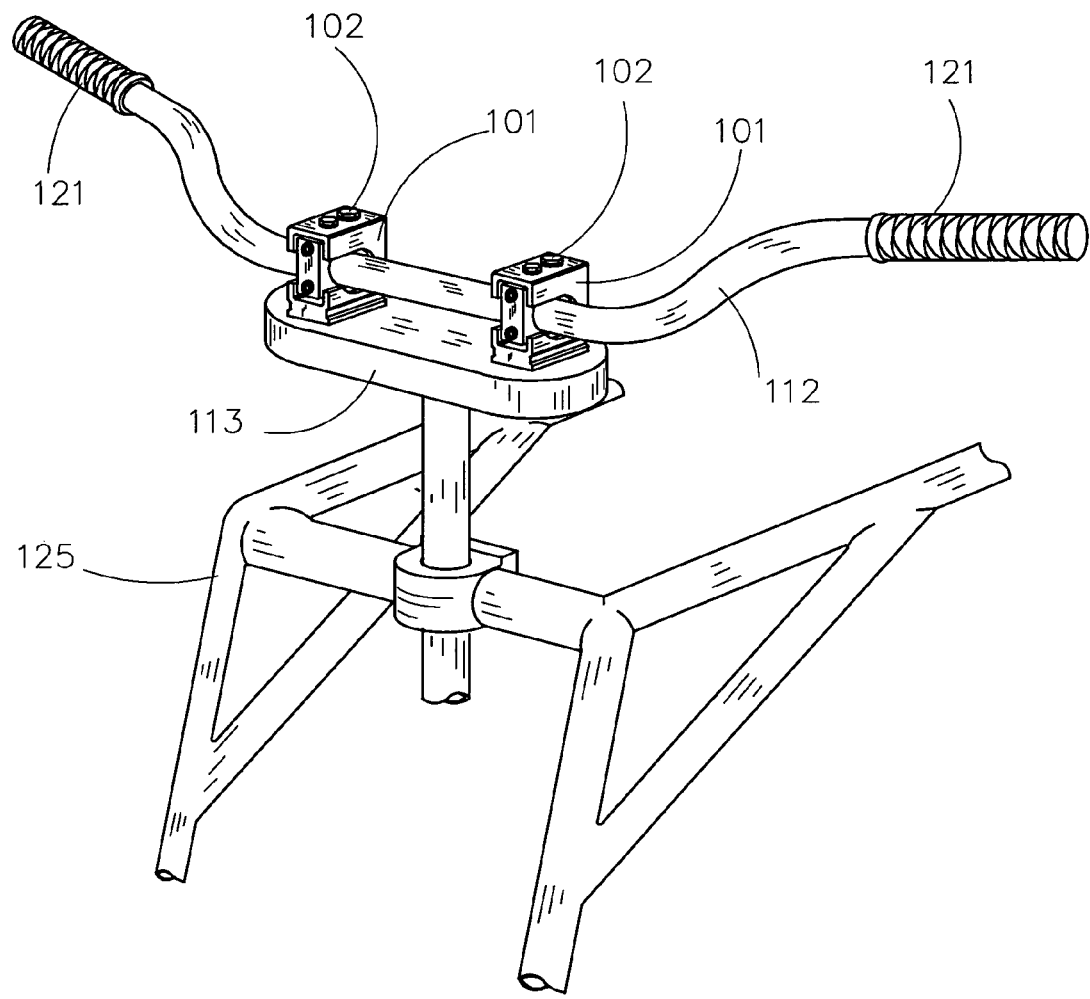
FIG. 1 is a perspective view of the handlebar mounting assembly shown attached to a steering stem of a vehicle's frame.

101) Housing
102) Guide
112) Handlebar, vehicle's
113) Steering mechanism, vehicle's
121) Hand grip
125) Frame, vehicle's
203) Slider
204) Clamp
205) Spring
206) Stop cap
207) Upper spring stop
208) Screw, clamp
209) Isolation pad
210) Isolator, guide
211) Fastener, housing
214) Guided surface, slider
215) Shim set
216) Nut
217) First suspended component
322) Plane, guide set
323) Plane offset
413) Conical steering mechanism, vehicle's
420) Cross support, slider
422) Anti-vibration conical
501) Housing, support 520) Cross support, housing
603) Slider, pivot
610) Isolator, pivot guide
614) Guided surface, pivot
617) Second suspended component
701) Housing, ortho
702) Guide, ortho
703) Slider, ortho
709) Isolation guide pads
714) Guided surface, ortho
717) Third suspended component
801) Housing, angle guide
802) Guide, angle
803) Slider, angle
809) Isolation guide pads, angle
814) Guided surface, angle
817) Fourth suspended component
901) Housing, arcing guide
902) Guide, arcing
903) Slider, arcing
909) Isolation guide pads, arcing
914) Guided surface, arcing
917) Fifth suspended component
1001) Housing, open
1003) Slider, free
1004) Clamp, free
1007) Bumper, upper
1014) Guided surface, free
1017) Sixth suspended component

DETAILED DESCRIPTION OF THE EMBODIMENTS

The present embodiments find utility with a number of vehicles, including but without limitation to, all terrain vehicles (ATVs), motorcycles, snow mobiles, personal watercraft and other types of vehicles that employ handlebar assemblies to influence steering. These embodiments are particularly well suited for use with off-road vehicles.

The first embodiment is illustrated in FIG. 1 a set of shock and vibration damping handlebar mounting assemblies are shown mounted to a vehicle's steering mechanism 113. A vehicle's handlebar 112 with a hand grip set 121 is allowed to pass through a housing set 101.

Figure 3A:
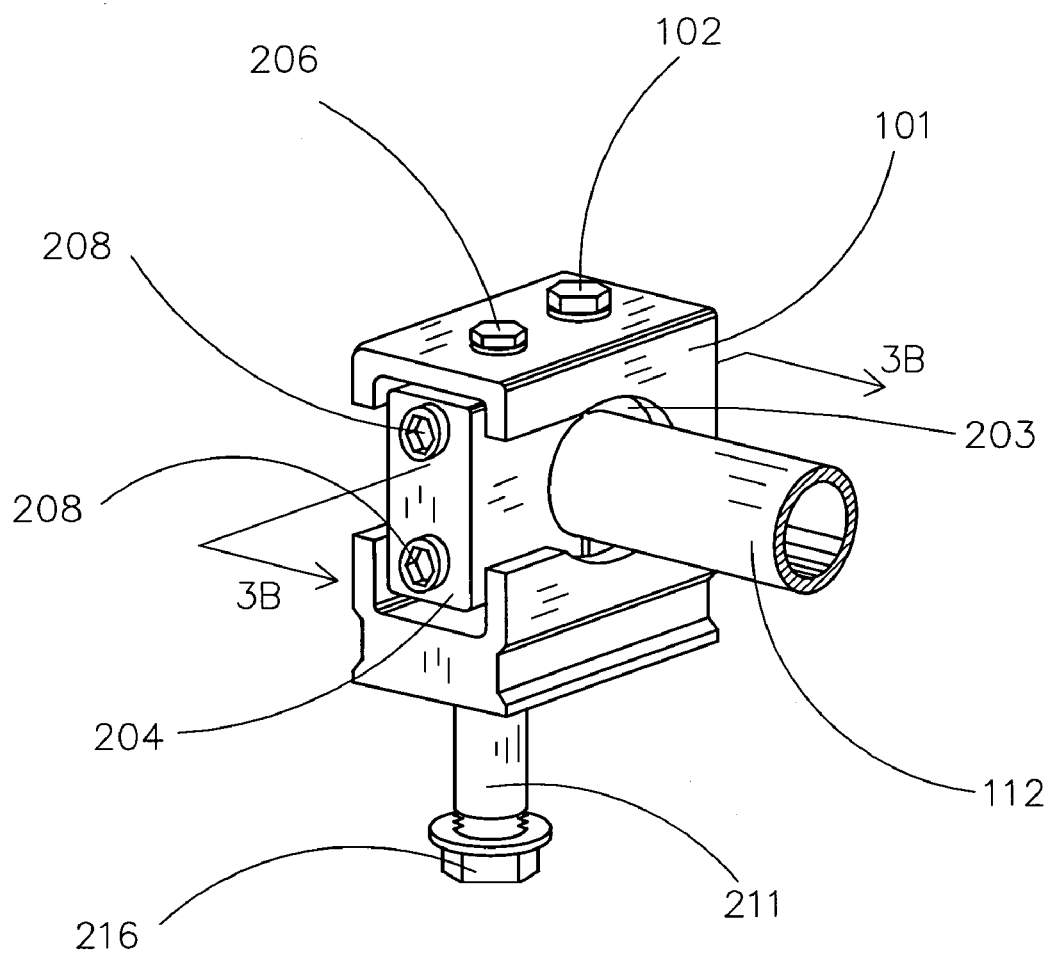
FIG. 3A is a perspective view showing one assembly of the set of assemblies.
Figure 3B:
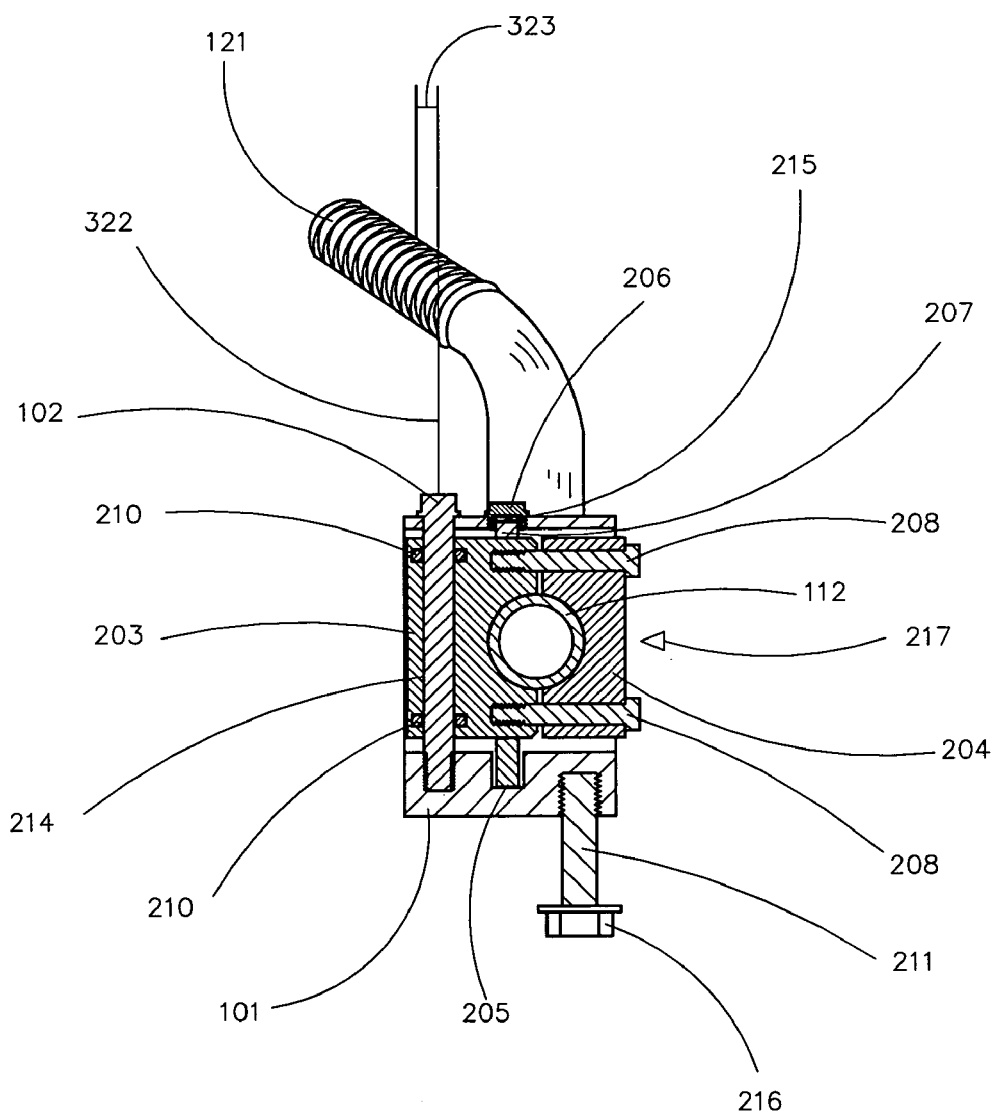
FIG. 3B is a sectional view of FIG. 3A also including the handlebars handgrip.

The shock and vibration damping handlebar mounting assembly is shown in greater detail in FIG. 3B Housing 101 supports a guide set 102 at each end comprising a non suspended component, a slider 203 with aperture to affix handlebar 112 by a clamp 204 and a clamp screw set 208 creating a first suspended component 217. A guide set plane 322 is created by guide set 102 centerlines. Slider 203 has a guided surface 214, with precise clearance to guide 102. A spring 205 is positioned in a recess of housing 101 beneath slider 203 or other component of first suspended component 217. A shim set 215 extends an upper spring stop 207; both are housed in a stop cap 206. Both or either spring 205 or upper spring stop 207 can be manufactured as a steel coil spring, or of any suitable spring material. In this embodiment, a solid polyurethane material with vibration deadening characteristics is employed.

Figure 2:
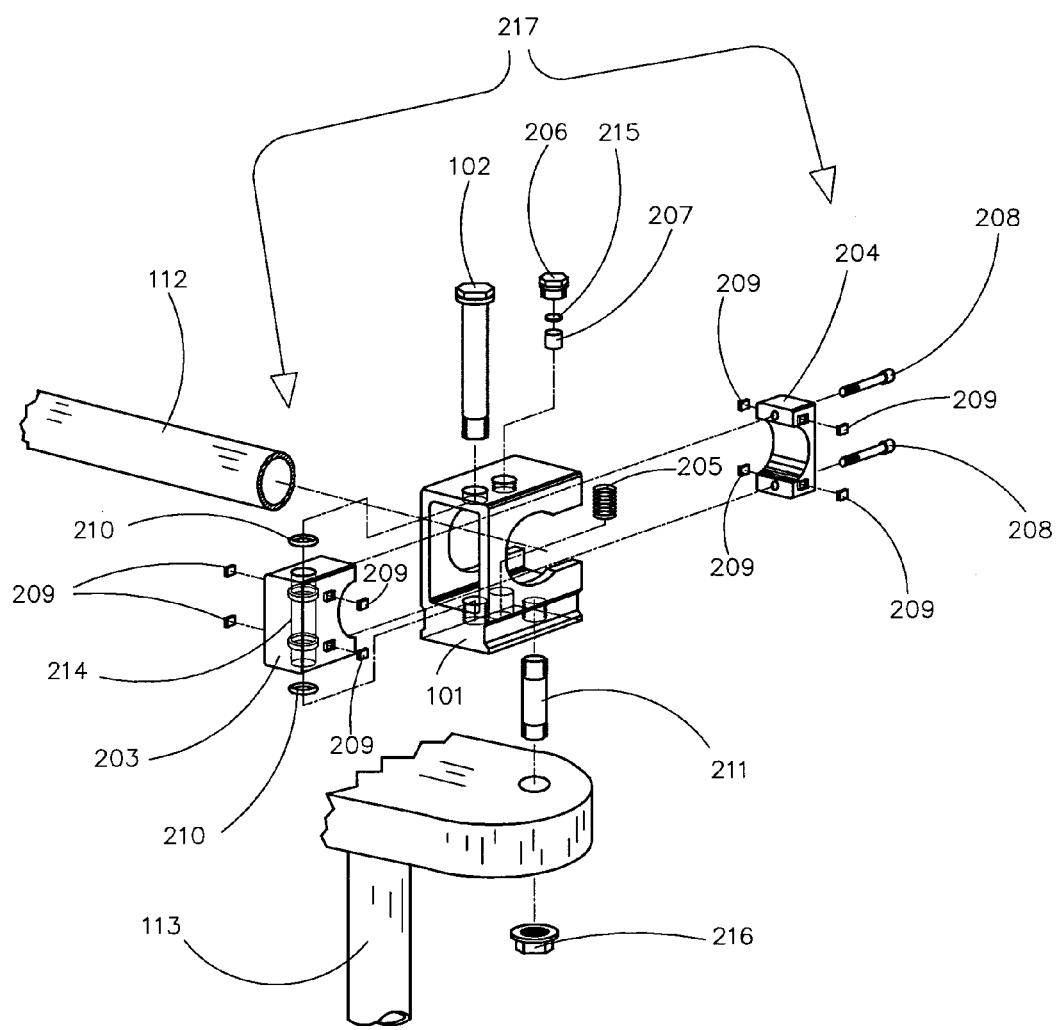
FIG. 2 is an exploded view of one assembly of the set of assemblies.

FIG. 2 An isolation pad set 209 are positioned into recesses of slider 203 and clamp 204 with a light compression fit to housing 101. In this embodiment, isolation pads 209 are made of PTFE, however other suitable materials with deadening and isolating characteristics can be used, or a combination of suitable materials can be used, such as Buna-n, nylon, polyurethane, polypropylene, viton, etc.

A guide isolator set 210 is captured in recesses of slider 203. In this embodiment guide isolators 210 are made of Buna-n though other suitable materials with deadening and isolating characteristics can be used or a combination of suitable materials can be used, such as PTFE, nylon, polyurethane, polypropylene, viton, etc.

Housing 101 utilizes a housing fastener 211 and a nut 216 to attach the shock and vibration damping handlebar mounting assembly to steering mechanism 113.

Vehicles and particularly off-road vehicles encounter and generate shock and vibration from their moving parts: motors, bearings, chains, wheels etc. and by the attenuation of shock caused by rough terrain. Shock and vibration attenuating through a vehicle's frame 125 and steering mechanism 113, to the vehicle's handlebar assembly, including vehicle's hand grip 121, and then to the rider's hands, is a well known cause of rider fatigue. This embodiment provides vibration damping of the vehicle's handlebar assembly and shock damping of the vehicle's handlebar assembly along a desired plane or path, reducing rider fatigue.

FIG. 2 In this preferred embodiment housing 101 is affixed to steering mechanism 113 by fastener 211 and nut 216. However, bolts, clamps, welding, adhesive, etc are suitable means for affixing housing 101 to steering mechanism 113. An integral construction of housing 101 and steering mechanism 113 is also a suitable alternative to this embodiment.

FIG. 3A In this preferred embodiment guide 102 is supported at both ends by housing 101 which is of open construction at clamp 204 end to allow for ease of installation of the vehicle's handlebars. However a closed end construction for greater support or lighter weight of the assembly with or without support at both ends of the guide is a reasonable alternative to this preferred embodiment.

FIG. 3B By isolating first suspended component 217, handlebar 112, slider 203, clamp 204, and clamp screw set 208, from the non suspended component, housing 101 and guide 102, vibration that would otherwise transfer to the rider's hands is deadened. The use of dissimilar vibration deadening materials with regard to FIG. 2 isolation pads 209 and guide isolators 210 isolates first suspended component 217 from housing 101 and deadens multiple frequency ranges. The use of dissimilar vibration deadening spring materials with regard to FIG. 3B spring 205 and upper spring stop 207 further isolates and dampens the transfer of vibration to hand grip 121 and therefore to the rider's hands. Spring 205 offers shock damping in the downward direction of travel, and upper spring stop 207, housed in cap 206, offers shock damping in the upward direction of travel of slider 203 and therefore shock damping first suspended component 217 as it travels along guide 102. Guided surface 214 of slider 203 has precise clearance to guide 102 limiting movement of first suspended component 217 to along guide 102.

With the use of hand tools spring 205 and/or upper spring stop 207 can easily be exchanged with a higher or lower compression rated spring and/or another suitable spring material that would be better suited for a particular course, terrain, or vehicle. As an alternative to, or in conjunction with, exchanging spring 205 and upper spring stop 207 with stiffer or softer springs, the spring tension can also be altered by changing the thickness or removing shim set 215 in part or entirely, thus altering or eliminating spring preload. Other methods for altering spring tension are adjusting the stop cap height using its threads or by adding an additional threaded component to relocate upper spring stop 207.

FIG. 3B The centerlines of guide set 102 creates the guide set plane 322, with distance to handgrips 121 of a plane offset 323. The ratio between slider guided surface 214 length and plane offset 323 allows smooth motion of slider 203 along the desired path of guide 102 when shock is applied to the vehicle's wheels due to rough terrain, thus limiting torque and friction between slider 203 and guide 102. In this embodiment plane offset 323 is shown in close proximity to hand grips 121 allowing free sliding movement of first suspended component 217 along guide 102.

In this embodiment guide set plane 322 is in parallel alignment to FIG. 1 the vehicle steering mechanism's axis of rotation, but can be aligned to a different beneficial plane to best absorb shock, or to absorb the rider's influence caused by the shock.

FIG. 3B By aligning guide set plane 322 parallel to the axis of steering rotation, forces applied for the purpose of steering are fully applied to the steering process and not partially absorbed in the handlebar assembly. An additional benefit of this embodiment is the angle of the handlebar 112, relative to FIG. 1 vehicle's frame 125 through the travel of FIG. 3B first suspended component 217 along guide set plane 322.

The second embodiment is represented in FIGS. 6A 6B 6C 6D 3B. This embodiment employs a similar arrangement as the first embodiment represented schematically in FIG. 1, FIG. 2 FIG. 3A and FIG. 3B. The changes will be described below; additional or altered parts from the first embodiment are illustrated with part numbers beginning with the number 6.

Figure 6A:
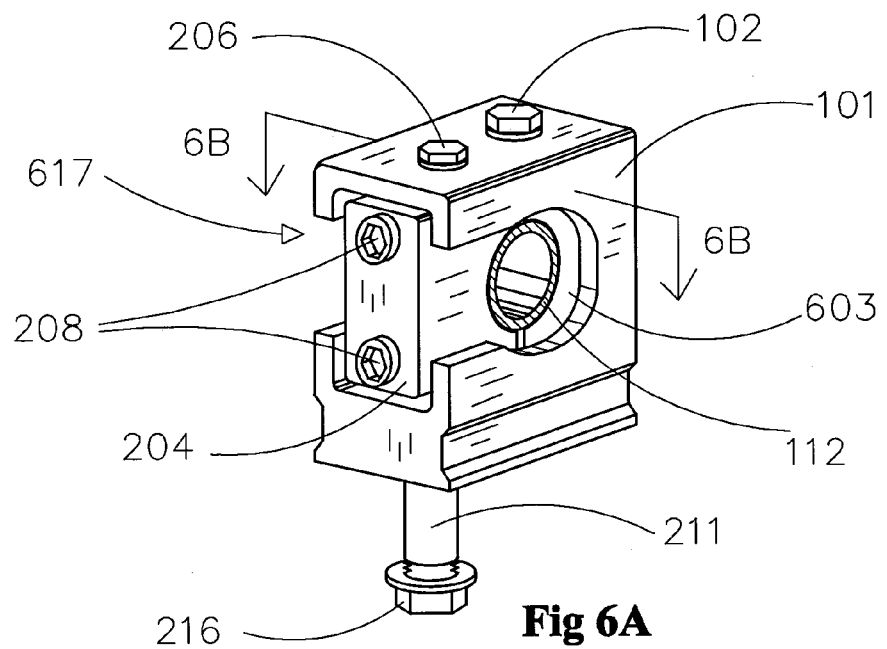
FIG. 6A is a perspective view of another embodiment showing one assembly of the set of assemblies.
Figure 6B:
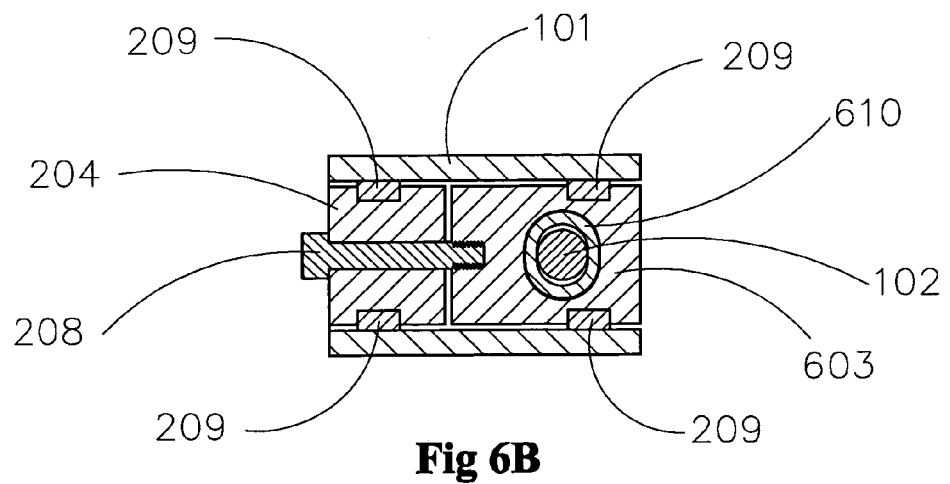
FIG. 6B is a horizontal sectional view of FIG. 6A.
Figure 6C:
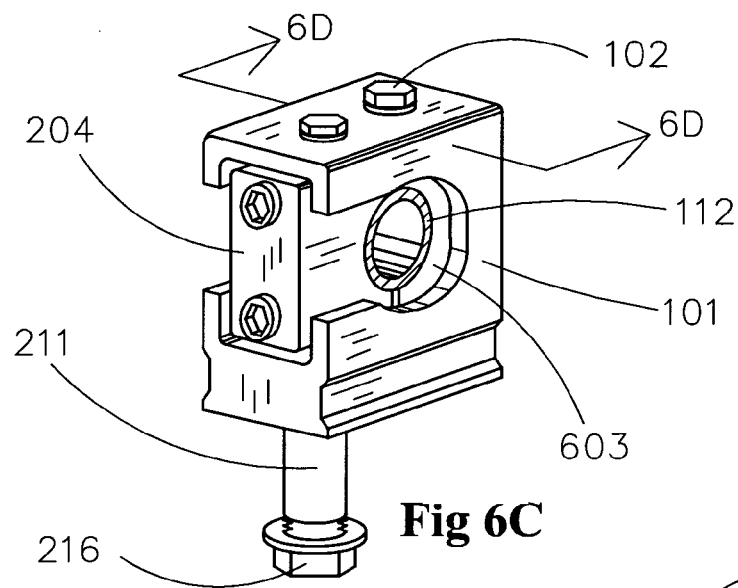
FIG. 6C is the perspective view of FIG. 6A showing vertical sectioning lines.
Figure 6D:
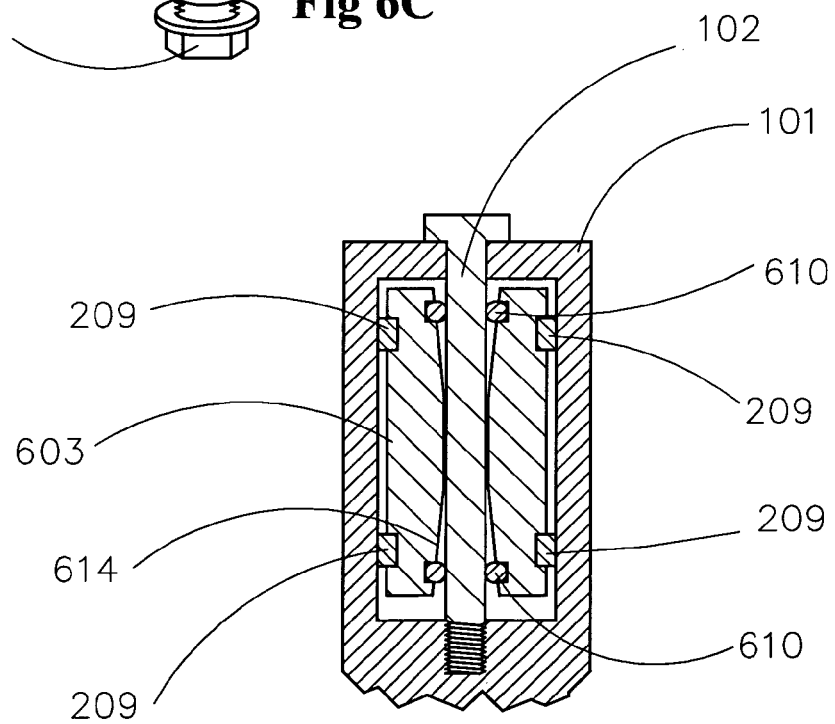
FIG. 6D is a vertical sectional view of FIG. 6C.

The shock and vibration damping handlebar mounting assembly of this embodiment is shown in greater detail in FIG. 6A. Housing 101 supports guide 102 at each end, a pivot slider 603 is affixed to handlebars 112 by clamp 204 and clamp screw set 208 creating a second suspended component 617. In this embodiment FIG. 6D pivot slider 603 with a slider pivot guide surface 614 is manufactured with clearance toward the top and bottom as it relates to guide 102. FIG. 6B A pivot guide isolator set 610 isolates guide 102 from pivot slider 603. Isolation pad set 209 is positioned into recesses of slider 603 and clamp 204 with a light compression fit between the before mentioned parts and housing 101. FIG. 6B shows a horizontally cut view of this embodiment, while a vertical cross sectional view FIG. 3B from the first embodiment also illustrates this embodiment.

Vehicles, particularly vehicles with two front wheels such as ATV's, or two support members such as snowmobiles produce a great deal of jarring as one wheel or ski hit an obstruction in the vehicle's path. Contact with these obstructions can cause one side of the vehicle to abruptly raise or lower, jarring the rider. This embodiment illustrated in FIG. 6D allows the handlebar mounting assembly to absorb the aforementioned jarring by allowing a rotational element to the shock absorption along the plane created by guide set 102. When one front wheel or support member encounters an obstruction in its path causing the side of the vehicle to raise or lower abruptly, handlebars 112 are allowed to maintain their relative parallel position to the path by allowing one pivot slider 603 of the set to travel along guide 102 while the other pivot slider 603 of the set does not travel along guide 102 but is allowed to pivot due to the clearance in slider pivot guided surface 614 relative to its guide 102. Isolation pads 209 are manufactured of a compressible material to allow for compression against housing 101 during the pivot of slider 603.

This embodiment differs from the first embodiment by adding side clearance between guide 102 and slider pivot guided surface 614 preferably at its top and bottom, pivot guide isolator set 610 provides isolation and free motion of pivot slider 603 along guide 102 and is limited by slider pivot guided surface 614. All other functions and advantages to the first embodiment also apply to this embodiment.

The third embodiment is represented in FIGS. 7A 7B 7C 7D. This embodiment employs a similar arrangement to the first embodiment represented schematically in FIG. 1, FIG. 2 FIG. 3A and FIG. 3B. The changes will be described below; additional or altered parts from the first embodiment are illustrated with part numbers beginning with the number 7.

Figure 7A:
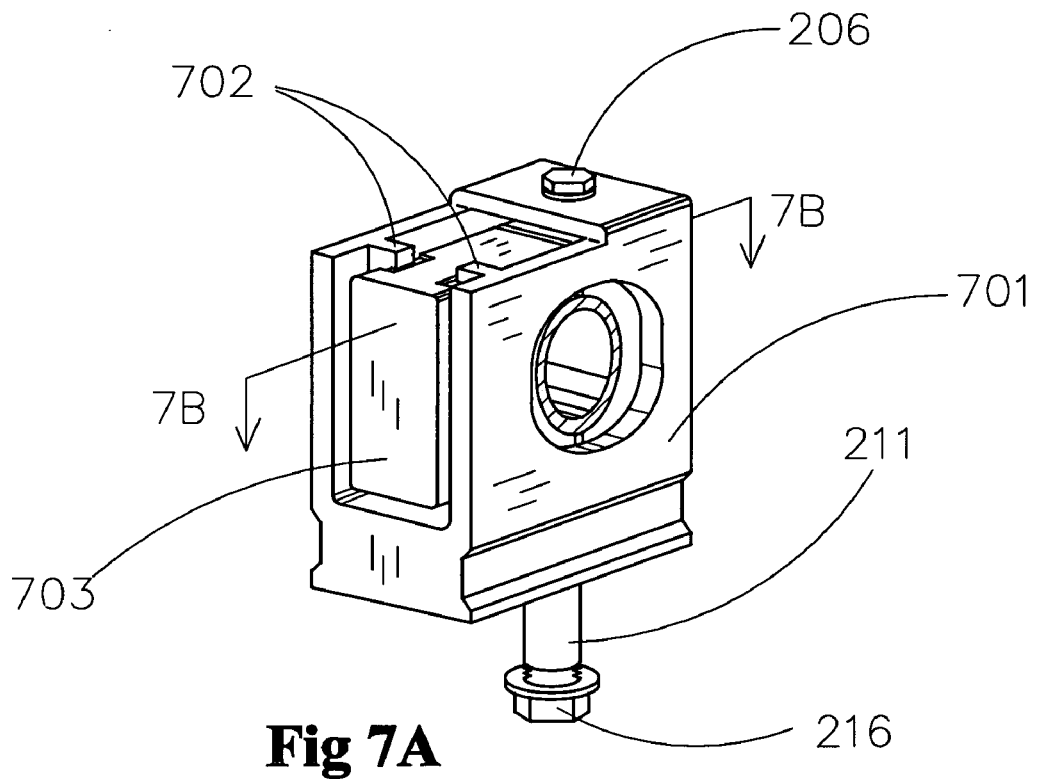
FIG. 7A is a perspective view of another embodiment showing one assembly of the set of assemblies.
Figure 7B:
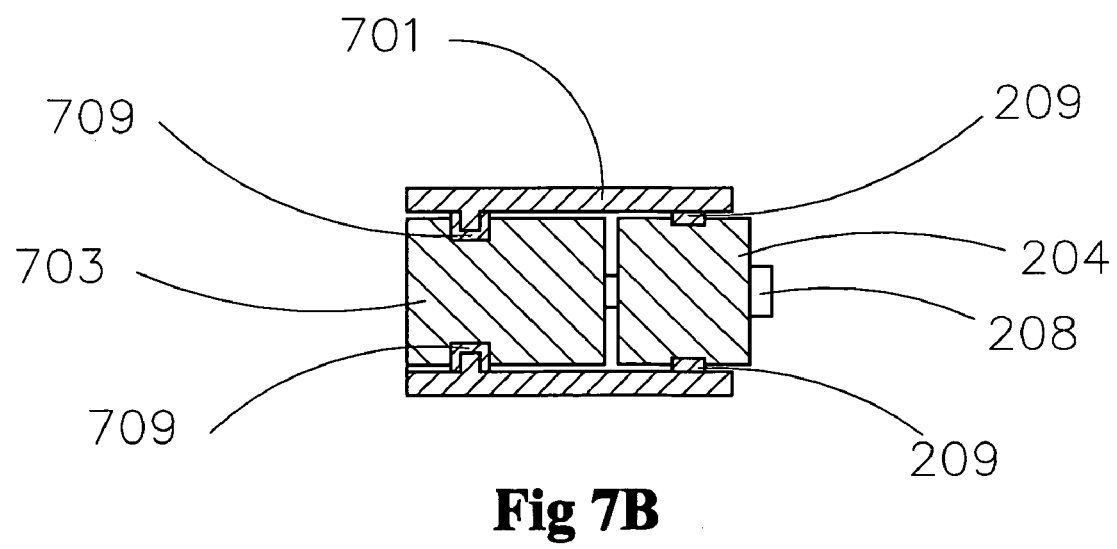
FIG. 7B is a horizontal sectional view of FIG. 7A.
Figure 7C:
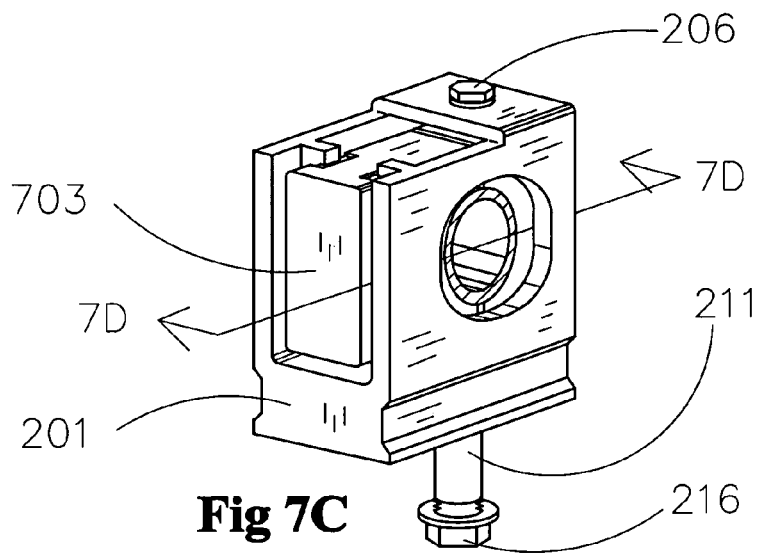
FIG. 7C is the perspective view of FIG. 7A showing vertical sectioning lines.
Figure 7D:
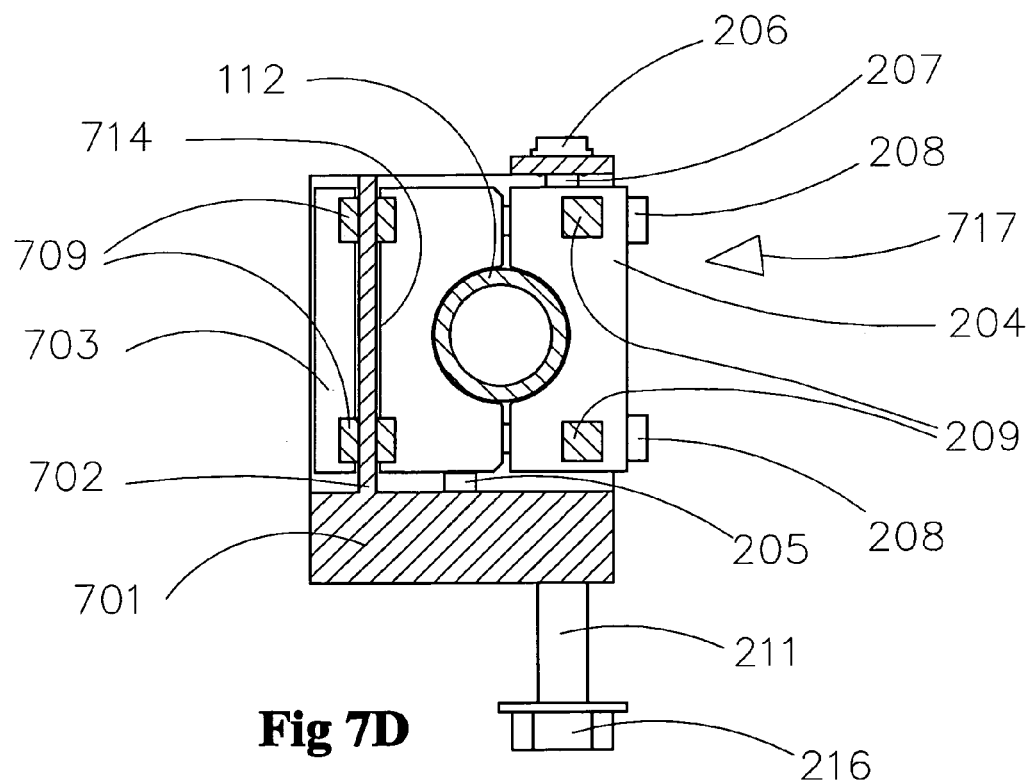
FIG. 7D is a vertical sectional view of FIG. 7C.

The shock and vibration damping handlebar mounting assembly of this embodiment is shown in greater detail in FIG. 7D. An ortho housing 701 supports an ortho guide set 702, an ortho slider 703 is affixed to handlebar 112 by clamp 204 and clamp screw set 208 creating a third suspended component 717. Ortho slider 703 with an ortho guided surface 714 has precise clearance to its guide.

Spring 205 is positioned in a recess of ortho housing 701 beneath ortho slider 703 or other component of third suspended component 717. As in FIG. 2 of the first embodiment shim set 215 extends upper spring stop 207, both are housed in stop cap 206. Both or either spring 205 or upper spring stop 207 can be manufactured as a steel coil spring, or of any suitable spring material. In this embodiment a solid polyurethane material with vibration deadening characteristics is employed.

Illustrated in FIG. 7D isolation pad set 209 is positioned into recesses of clamp 204 with a light compression fit between the before mentioned parts and ortho housing 701. An isolation guide pad set 709 recesses into ortho slider 703 with a light compression fit between the before mentioned parts, ortho housing 701 and ortho guide 702. In this embodiment, the isolation pads are made of PTFE, however other suitable materials with deadening and isolating characteristics can be used. A combination of suitable materials can also be used such as Buna-n, nylon, polyurethane, polypropylene, viton, etc.

Ortho housing 701 utilizes housing fastener 211 and nut 216 to attach the shock and vibration damping handlebar mounting assembly to FIG. 1 steering mechanism 113.

This embodiment offers an alternative to the manufacturing processes employed in the first embodiment while maintaining the benefits of the first embodiment. The most relevant changes are to FIG. 7D housing 701, guides 702, and guided surface 714. This embodiment employs ortho guide 702 and ortho slider 703 with isolation guide pads 709 used for the purpose of isolating third suspended component 717 from the non suspended components, and deadening vibration while allowing travel of third suspended component 717 along a precisely manufactured slot that allows slight compression of the pad to ortho guide 702.

The fourth embodiment is represented in FIGS. 8A 8B 8C 8D. This embodiment employs a similar arrangement as the third embodiment, represented schematically in FIGS. 7A 7B 7C 7D. The changes will be described below; additional or altered parts from the third embodiment are illustrated with part numbers beginning with the number 8.

Figure 8A:
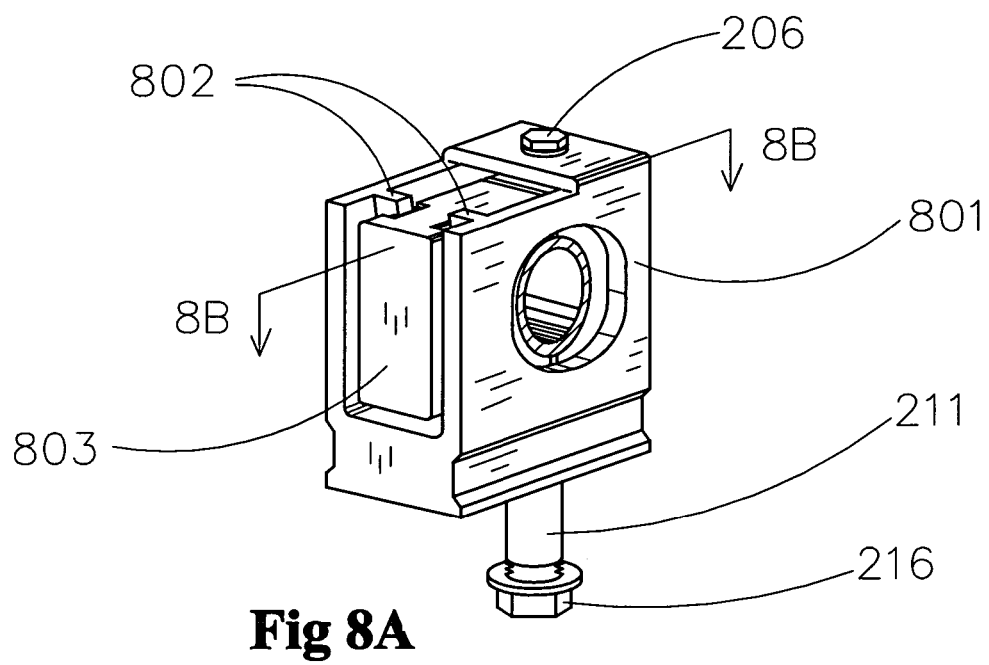
FIG. 8A is a perspective view of another embodiment showing one assembly of the set of assemblies.
Figure 8B:
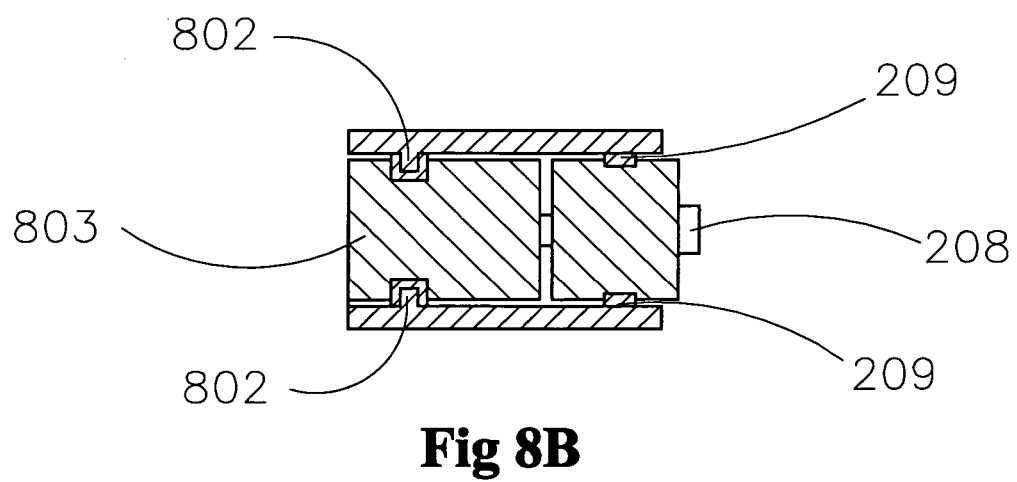
FIG. 8B is a horizontal sectional view of FIG. 8A.
Figure 8C:
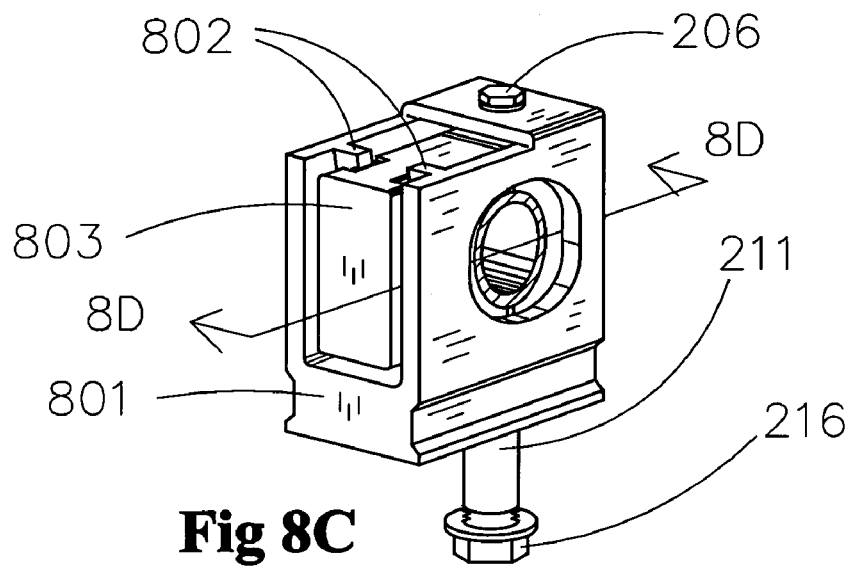
FIG. 8C is the perspective view of FIG. 8A showing vertical sectioning lines.
Figure 8D:
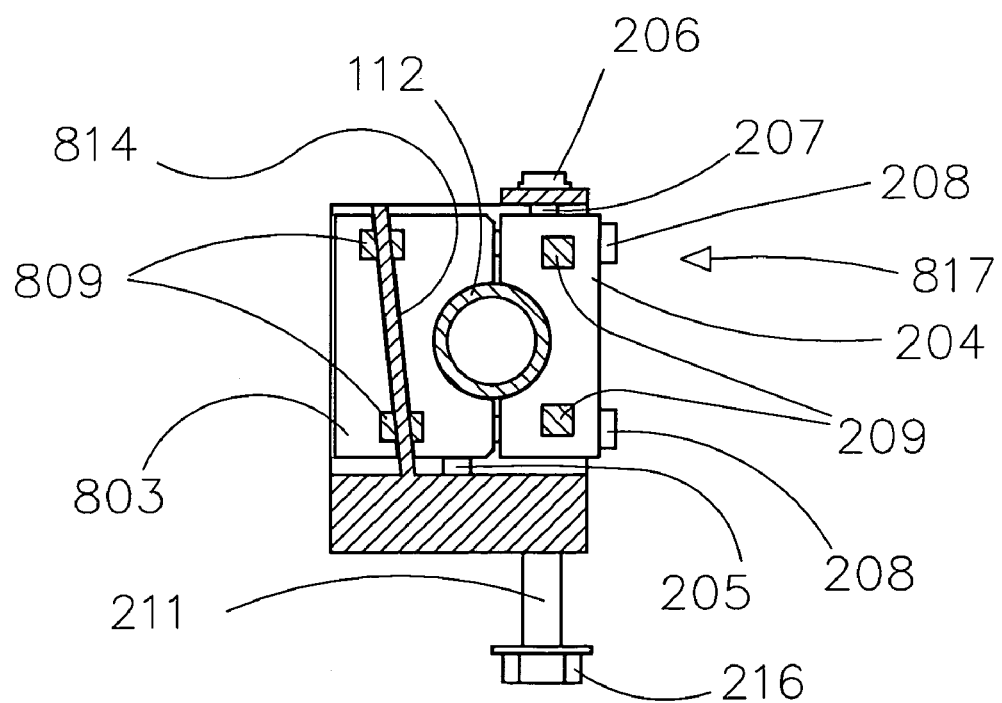
FIG. 8D is a vertical sectional view of FIG. 8C.

The shock and vibration damping handlebar mounting assembly of this embodiment is shown in greater detail in FIG. 8D. An angle guide housing 801 supports an angle guide set 802, an angle slider 803 is affixed to handlebars 112 by clamp 204 and clamp screw set 208 creating a fourth suspended component 817. Angle slider 803 with an angle guided surface 814 has precise clearance to its guide.

Spring 205 is positioned in a recess of angle housing 801 beneath angle slider 803 or other component of suspended component 817. As in FIG. 2 of the first embodiment shim set 215 extends upper spring stop 207, both are housed in stop cap 206. Both or either spring 205 or upper spring stop 207 can be manufactured as a steel coil spring, or of any suitable spring material. In this embodiment a solid polyurethane material with vibration deadening characteristics is employed.

Illustrated in FIG. 8D isolation pad set 209 is positioned into recesses of clamp 204 with a light compression fit between the before mentioned parts and angle housing 801. An angle isolation guide pad set 809 recesses into angle slider 803 with a light compression fit between the before mentioned parts, angle housing 801 and angle guide 802. In this embodiment, the isolation pads are made of PTFE, however other suitable materials with deadening and isolating characteristics can be used. A combination of suitable materials can also be used such as Buna-n, nylon, polyurethane, polypropylene, viton, etc.

Angle housing 801 utilizes housing fastener 211 and nut 216 to attach the shock and vibration damping handlebar mounting assembly to FIG. 1 steering mechanism 113.

This embodiment offers an alternative to the third embodiment where travel of FIG. 8D handlebar 112 and other components of fourth suspended component 817 at an angle other than that of FIG. 1 the vehicle's steering mechanism axis of rotation is preferred. FIG. 8D Housing 801, guides 802, slider 803, and guided surface 814 are manufactured to allow motion of the fourth suspended component at an angle. Angle isolation pads 809 are used for the purpose of isolating the fourth suspended component 817 from housing 801, and deadening vibration while allowing travel of the fourth suspended component 817 along a precisely manufactured slot that allows slight compression of the pad to angle guide 802.

The fifth embodiment is represented in FIGS. 9A 9B 9C 9D. This embodiment employs the same arrangement as the third embodiment represented schematically in FIGS. 7A 7B 7C 7D. The changes will be described below; additional or altered parts from the third embodiment are illustrated with part numbers beginning with the number 9.

Figure 9A:
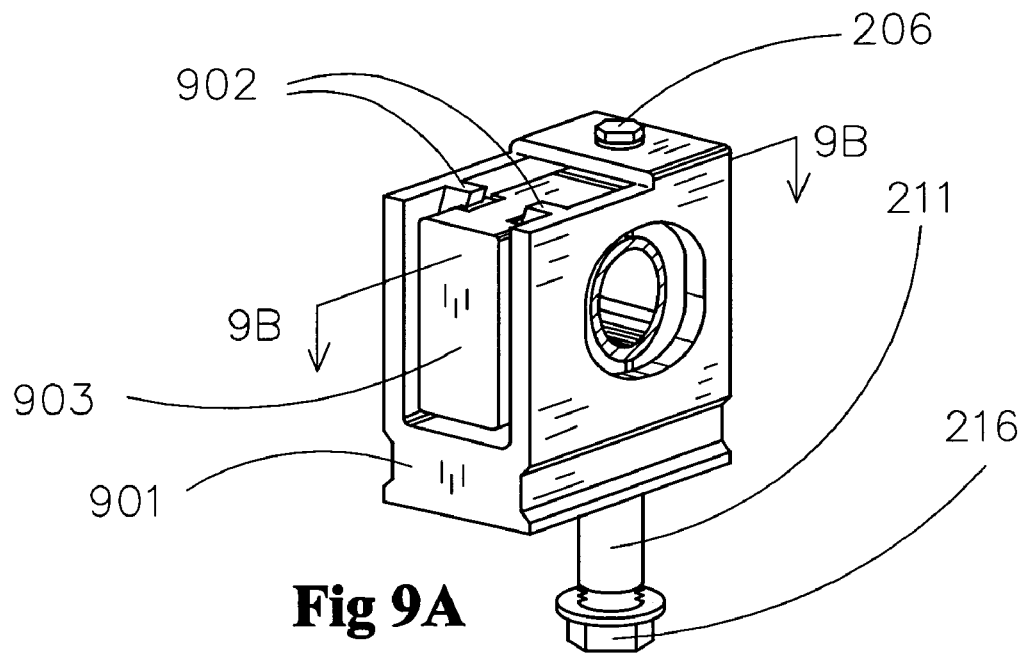
FIG. 9A is a perspective view of another embodiment showing one assembly of the set of assemblies.
Figure 9B:
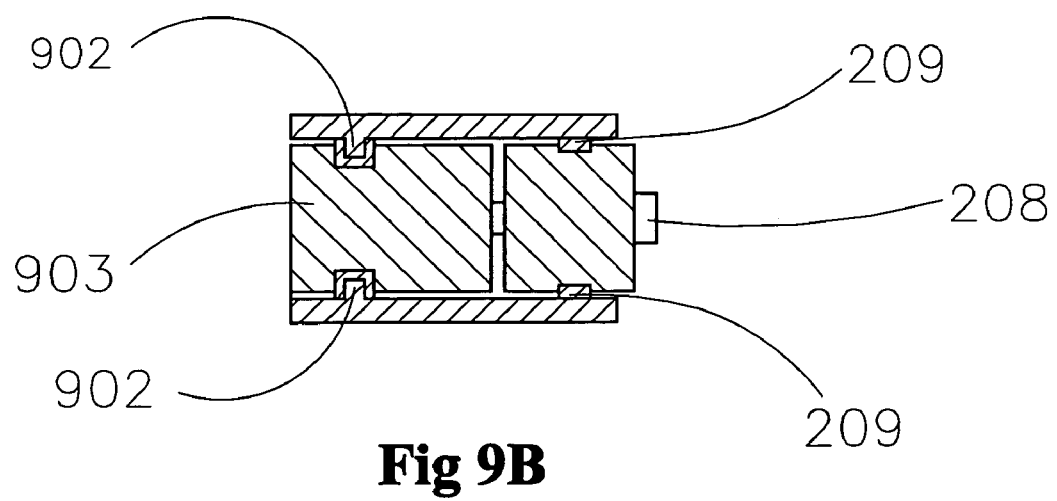
FIG. 9B is a horizontal sectional view of FIG. 9A.
Figure 9C:
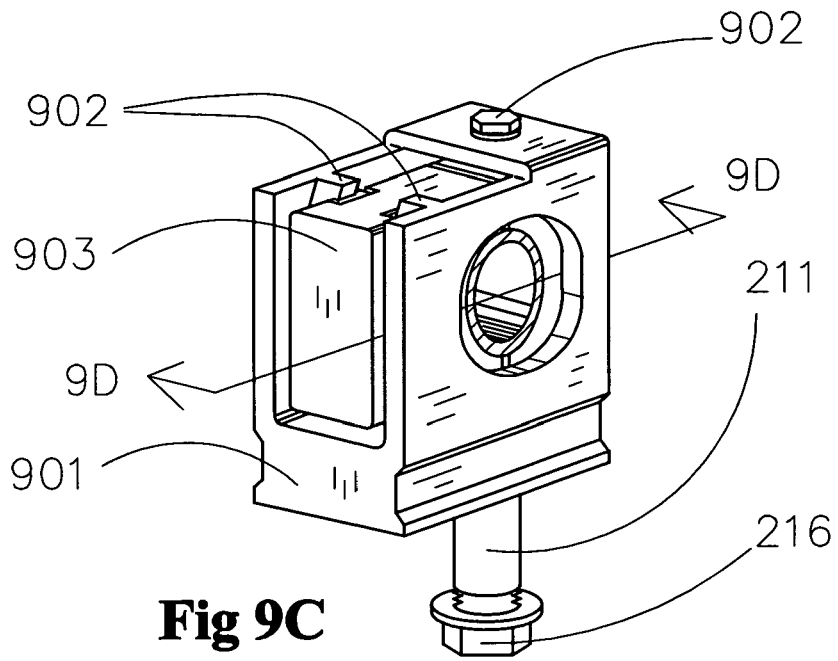
FIG. 9C is the perspective view of FIG. 9A showing vertical sectioning lines.
Figure 9D:
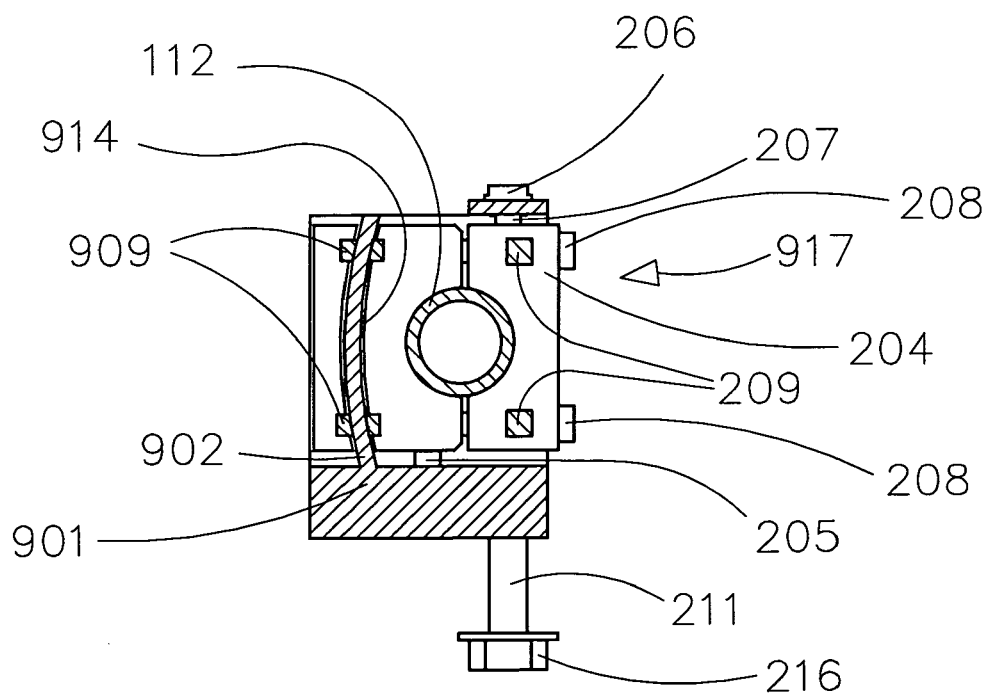
FIG. 9D is a vertical sectional view of FIG. 9C.

The shock and vibration damping handlebar mounting assembly of this embodiment is shown in greater detail in FIG. 9D. An arcing guide housing 901 supports an arcing guide set 902, an arcing slider 903 is affixed to handlebars 112 by clamp 204 and clamp screw set 208 creating a fifth suspended component 917. Arcing slider 903 with an arcing guided surface 914 has precise clearance to its guide.

Spring 205 is positioned in a recess of arcing housing 901 beneath arcing slider 903 or other component of suspended component 917. As in FIG. 2 of the first embodiment shim set 215 extends upper spring stop 207, both are housed in stop cap 206. Both or either spring 205 or upper spring stop 207 can be manufactured as a steel coil spring, or of any suitable spring material. In this embodiment a solid polyurethane material with vibration deadening characteristics is employed.

Illustrated in FIG. 9D isolation pad set 209 is positioned into recesses of clamp 204 with a light compression fit between the before mentioned parts and arcing housing 901 for the purpose of isolating fifth suspended component 917 from the non suspended components and deadening vibration. An arcing isolation guide pad set 909 recesses into arcing slider 903 with a light compression fit between the before mentioned parts, arcing housing 901 and arcing guide 902. In this embodiment, the isolation pads are made of PTFE, however other suitable materials with deadening and isolating characteristics can be used. A combination of suitable materials can also be used such as Buna-n, nylon, polyurethane, polypropylene, viton, etc.

Arcing housing 901 utilizes housing fastener 211 and nut 216 to attach the shock and vibration damping handlebar mounting assembly to FIG. 1 steering mechanism 113.

FIG. 9D This embodiment offers an alternative to the third embodiment where travel of handlebars 112 and other components of fifth suspended component 917 at a predetermined arc is beneficial. One example of a beneficial arc is one with fulcrum at the vehicle's foot pegs and radius approximate to the distance from the foot pegs to the handlebar. This example allows the handlebar angle to remain consistent relative to the rider as fifth suspended component 917 travels along the arc rather than to FIG. 1 the vehicle's frame.

FIG. 9D This embodiment employs arcing guide 902 and arcing slider 903 with arcing guided surface 914 to allow travel of fifth suspended component 917 along guide 902. Arcing isolation pads 909 used for the purpose of isolating fifth suspended component 917 from the non suspended components, and deadening vibration while allowing travel of fifth suspended component 917 along a precisely manufactured arcing slot allows slight compression of the pad to arcing guide 902.

Figure 11:
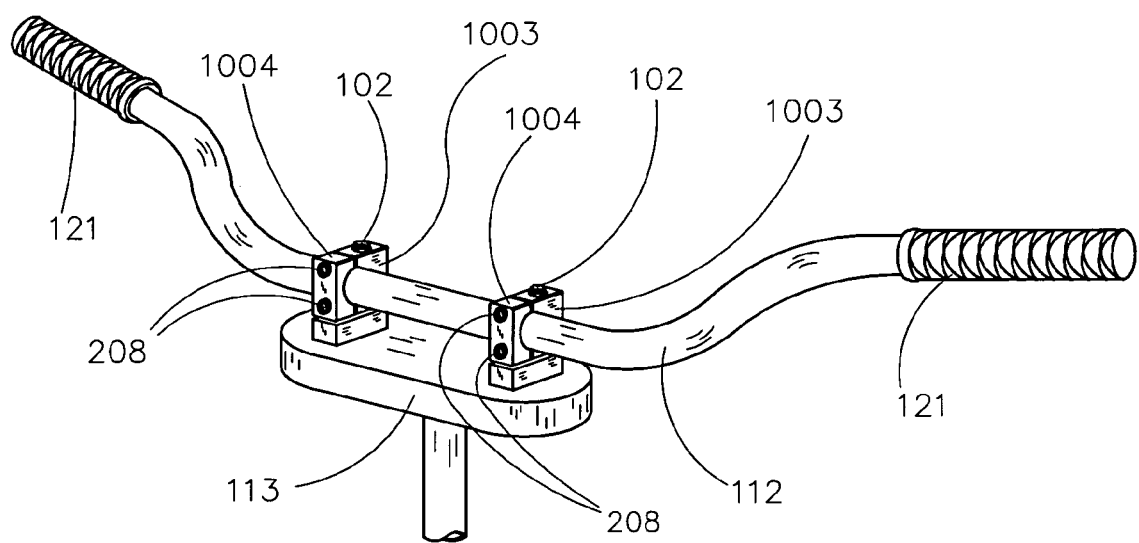
FIG. 11 is a perspective view of the embodiment of FIG. 10A-10B.

The sixth embodiment is illustrated in FIG. 11 a set of shock and vibration damping handlebar mounting assemblies are shown mounted to steering mechanism 113. Handlebar 112, with hand grip set 121, passes through a free slider set 1003 and a free clamp set 1004. This embodiment employs a similar arrangement to the first embodiment represented schematically in FIG. 1, FIG. 2 FIG. 3A and FIG. 3B. The changes will be described below; additional or altered parts from the first embodiment are illustrated with 4 digit part numbers beginning with the number 10.

Figure 10A:
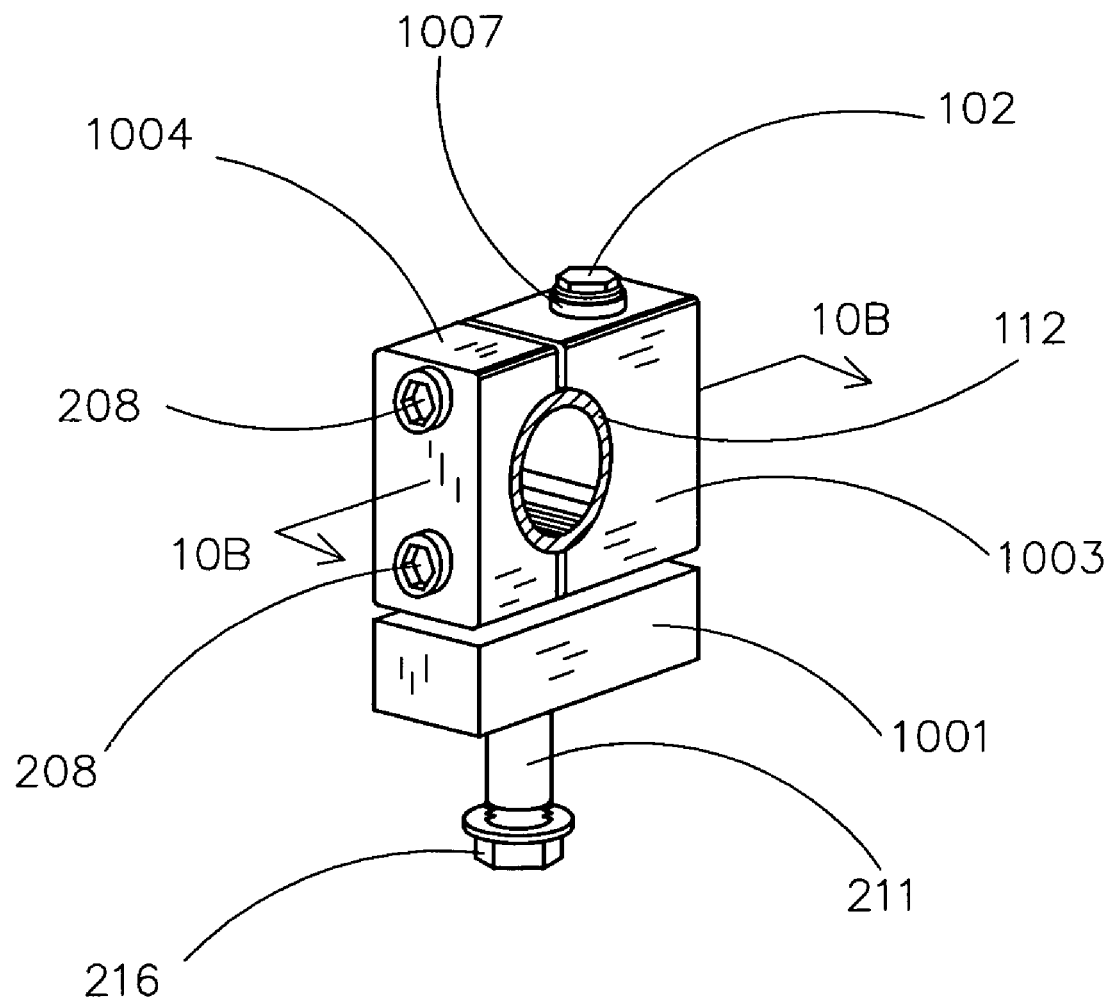
FIG. 10A is a perspective view of another embodiment showing one assembly of the set of assemblies.
Figure 10B:
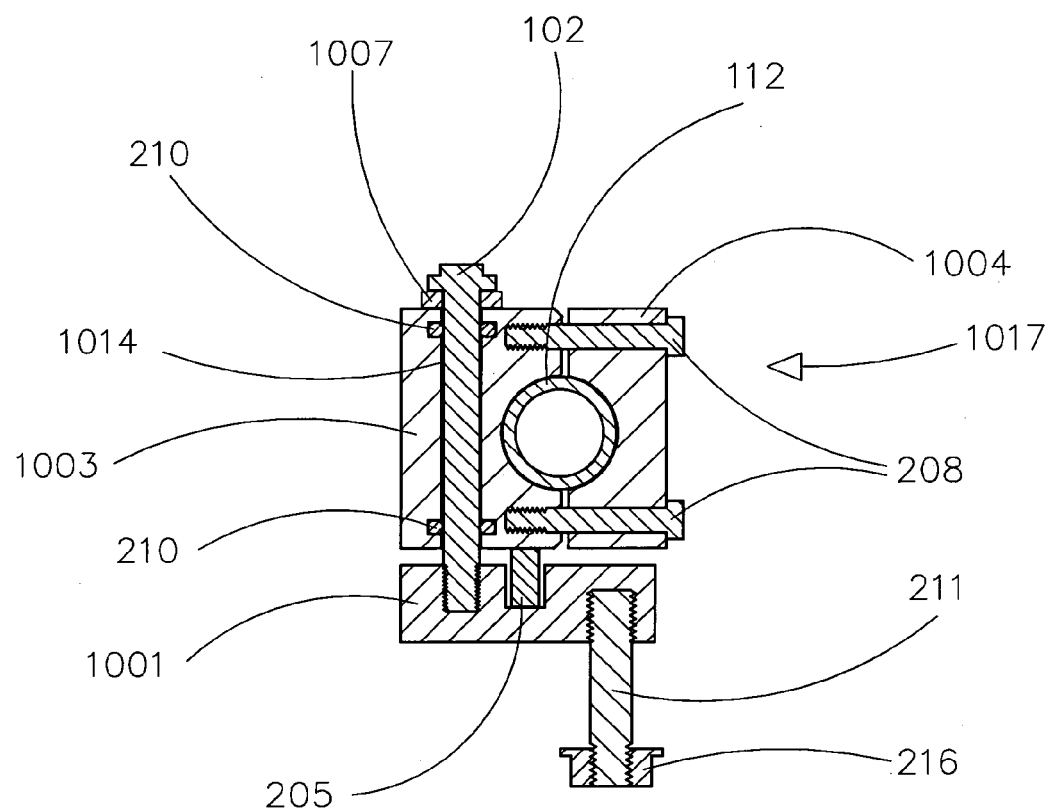
FIG. 10B is a vertical sectional view of FIG. 10A.

The shock and vibration damping handlebar mounting open assembly is shown in greater detail in FIG. 10B. An open housing 1001 supports guide 102 at one end, free slider 1003 is affixed to handlebar 112 by free clamp 1004 and clamp screw set 208 creating a sixth suspended component 1017. Free slider 1003 with a free guided surface 1014 has precise clearance to its guide.

Spring 205 is positioned in a recess of housing 101 beneath free slider 1003 or other component of suspended component 1017. An upper bumper 1007 pre-loads spring 205. Both or either spring 205 or upper bumper 1007 can be manufactured as a steel coil spring, or of any suitable spring material. In this embodiment a polyurethane material with vibration deadening characteristics is employed.

Guide isolator set 210 is captured in recesses of free slider 1003. In this embodiment guide isolators 210 are made of Buna-n though other suitable materials with deadening and isolating characteristics can be used. A combination of suitable materials can also be used such as PTFE, nylon, polyurethane, polypropylene, viton, etc.

Open housing 1001 utilizes housing fastener 211 and nut 216 to attach the shock and vibration damping handlebar mounting assembly to FIG. 11 steering mechanism 113.

FIG. 10B This embodiment utilizes open housing 1001, where sixth suspended component 1017, slider 1003 with guided surface 1014, handlebar 112, and clamp 1004 is allowed to slide along guide 102. This embodiment offers a less expensive alternative to the manufacturing processes employed in the first embodiment while maintaining many of the benefits of the first embodiment.

Figure 4:
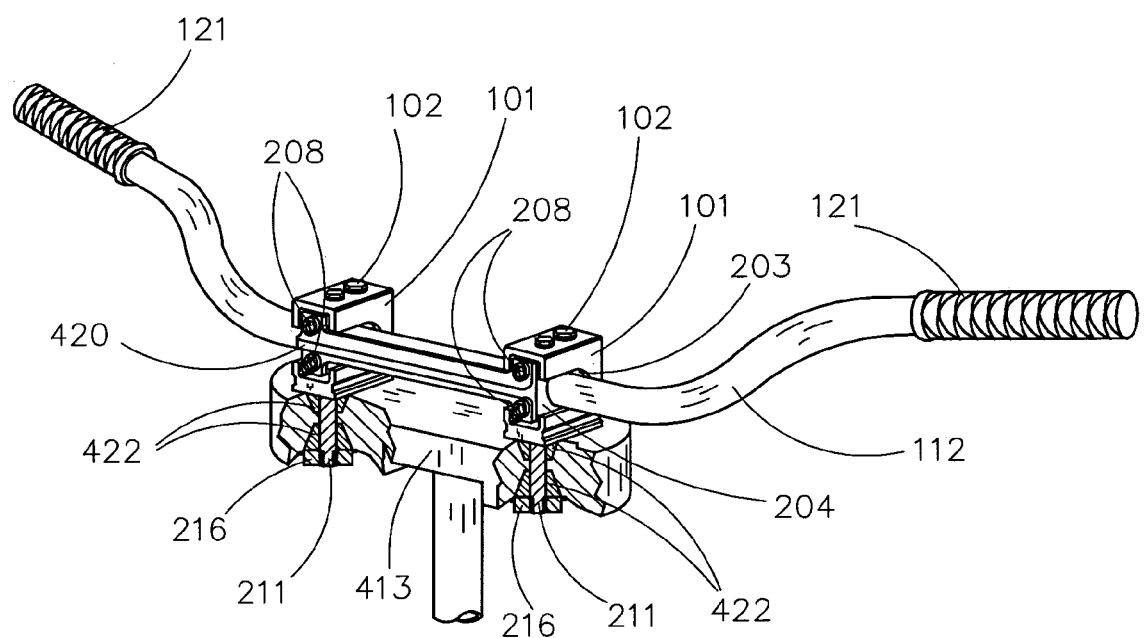
FIG. 4 is a partial cutaway perspective view of another embodiment with an alternative vehicle steering mechanism.

The seventh embodiment is represented in FIG. 4. This embodiment relates to all the previous embodiments.

In this preferred embodiment a cross support 420 is affixed to clamp set 204 by clamp screws 208. However cross support 420 can be attached by additional fasteners and/or to slider 203. This preferred embodiment finds utility with handlebar vehicles employing an anti-vibration conical set 422 held in a vehicle's conical steering mechanism 413.

The addition of cross support 420 is particularly beneficial when the embodiment is affixed to a vehicle's steering mechanism that employs anti-vibration conical set 422. Anti-vibration conical set 422 is widely used in off-road motorsports for reducing vibration to handlebar 112 from vehicle's conical steering mechanism 413.

The use of cross support 420 with screws 208 reduces the slipping or twisting of handlebar 112 between clamp set 204 and slider set 203, or other clamp and slider from any of the before mentioned embodiments, when one end of handlebar 112 is subjected to an excessive amount of force commonly caused by contact with the ground during a crash. The twisting and slipping of the handlebar in its mounting assembly is a common problem encountered by vehicles employing conicals 422.

Figure 5:
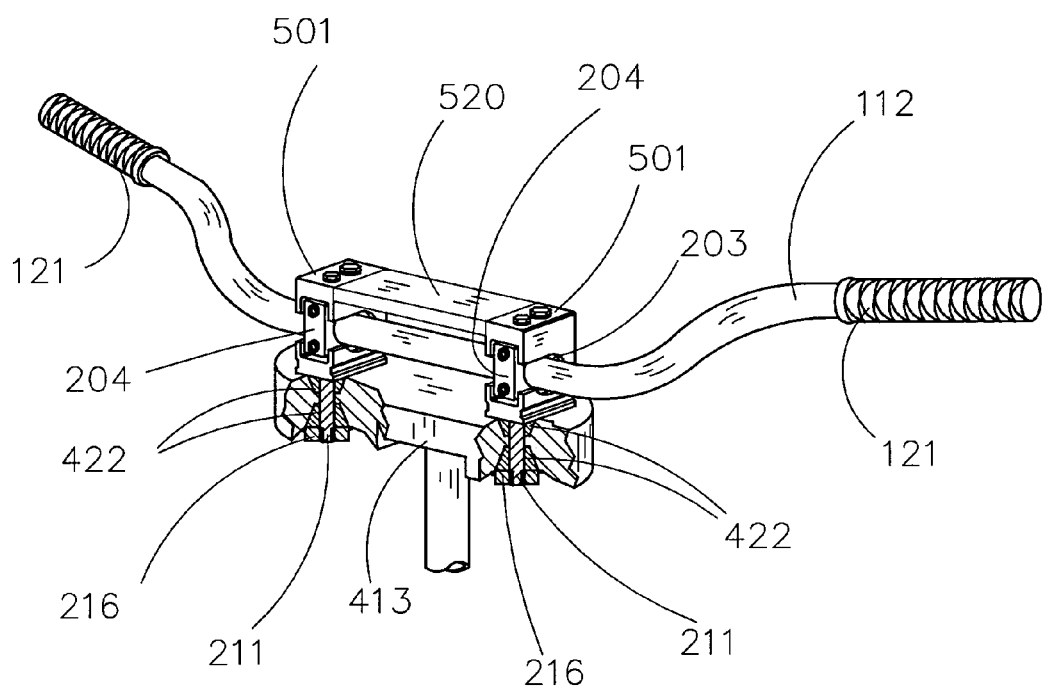
FIG. 5 is a partial cutaway perspective view of another embodiment with the vehicle steering mechanism of FIG. 4.

The eighth embodiment is represented in FIG. 5 FIG. 11 This embodiment relates to all the previous embodiments.

FIG. 5 A housing cross support 520 is affixed to a set of support housings 501 that houses handlebar 112, slider set 203, clamp set 204, and clamp screw set 208. In this embodiment housing cross support 520 is integral to support housing set 501 but could be manufactured as a separate piece to be affixed to support housing set 501 by fasteners, welding or adhering. Housing cross support 520 is shown as a top support, however cross support 520 is functional as a bottom, front, back or any combination of the before mentioned supports.

The addition of housing cross support 520 is particularly beneficial when the embodiment is affixed to steering mechanism 413 that employs anti-vibration conical set 422. Anti-vibration conicals 422 are a widely used practice in off-road motorsports for reducing vibration from handlebar 112 from steering mechanism 413. The use of housing cross support 520 reduces the slipping or twisting of handlebar 112 between clamp set 204 and slider set 203, or another clamp and slider from any of the before mentioned embodiments, when one end of handlebar 112 is subjected to an excessive amount of force commonly caused by contact with the ground during a crash. The twisting and slipping of the handlebar in its mounting assembly is a common problem encountered by vehicles employing conicals 422.

The ninth embodiment is represented in FIG. 3B. This embodiment relates to all the previous embodiments.

In this preferred embodiment the plane offset maximum distance, toward or away from the rider, is controlled by a ratio relating the length of guided surface 214, the width of guide 102, and plane offset 323. Plane offset distance 323 is less than two times the sum of the length of guided surface 214 minus the width of guide 102, plus one half the length of guided surface 214.

Controlling the relationship between guided surface 214, the width of guide 102, and plane offset 323, allows adequate free travel of the suspended components.

Thus the reader can easily envision at least one embodiment of the shock damping handle bar mounting assembly that provides a more reliable, light weight, economical to manufacture, device with superior functionality to previous inventions. While the above description contains much specificity, these should not be construed as limitations on the scope, but rather as an exemplification of one [or several] preferred embodiment thereof Many other variations are possible or a combination of variations, for example: A shock damping handlebar mounting assembly where the handlebar and suspended component are constructed of a single piece, an assembly that uses other means than a clamp for affixing the handlebar to the slider, that utilizes a single or plurality of suspended components, that utilizes a single guide or a plurality of guides, that utilizes a multiple piece handlebar, that eliminates some or all isolating components, that eliminates either the spring or upper spring stop, that utilizes a tension spring for suspending components, that incorporates one of the embodiments into the steering mechanism of the vehicle, that affixes one of the embodiments to the steering mechanism of the vehicle by a single or plurality of fasteners, that affixes one of the embodiments to other types of steering mechanisms that may be the original equipment of the vehicle or an alteration or addition to the original vehicle.

What is claimed is:

1. A shock and vibration damping handlebar mount assembly for vehicles utilizing handlebar assisted steering mechanisms, comprising:
    a) a housing set of at least one housing,
    b) means for attaching said housing to a vehicle's steering mechanism,
    c) a guide set of at least one guide, supported by said housing,
    d) a slider set of at least one slider, slidably attached to said guide,
    e) comprising, a guided surface, an aperture configured to receive a handlebar, and
    f) a means for restraining said handlebar within said aperture;
    g) a suspended component comprising said slider, said handlebar, and said means for restraining said handlebar,
    h) a means for urging said suspended component upward from said housing set,
    i) a means for limiting, upward travel of said suspended component along said guide set,
    j) a guide set plane, whereby said guide set's longitudinal axis extends outward and parallel to said aperture of said slider set,
    k) a plane offset distance to said guided surface's length ratio whereby, torque observed between said handlebar and said guide set is nonrestrictive to desired travel of said slider along said guide set.

2. The shock and vibration damping handlebar mount assembly of claim 1 further including a guide isolator set of at least one guide isolator between said guide and said slider.

3. The shock and vibration damping handlebar mount assembly of claim 1 further including a second isolator set of at least one second isolator between said housing and said suspended component.

4. The shock and vibration damping handlebar mount assembly of claim 1 wherein said guided surface has added clearance along said guide set plane.

5. The shock and vibration thinning handlebar mount assembly of claim 1 further including a slider cross support connecting at least two of said sliders.

6. The shock and vibration damping handlebar mount assembly of claim 1 wherein said housing set is integral.

7. The shock and vibration damping handlebar mount assembly of claim 1 further including a housing cross support wherein at least two said housings of said housing set are connected by said housing cross support.

8. The shock and vibration damping handlebar mount assembly of claim 1 wherein said housing set is integral to said vehicle' steering mechanism.

9. The shock and vibration damping handlebar mount assembly of claim 1 wherein said means for limiting upward travel comprising a means for adjustably urging said suspended component downward.

10. A shock and vibration damping handlebar mount assembly for vehicles utilizing handlebar assisted steering mechanisms, comprising:
   a) a housing set of at least one housing,
   b) means for attaching said housing to a vehicle's steering mechanism,
   c) a guide set of at least one guide, supported by said housing, where said guide set controls
   d) a slider set of at least one slider, slidably attached to said guide, comprising, a guided surface, an aperture configured to receive a handlebar, and
   e) a means for restraining said handlebar in said aperture;
   f) a suspended component comprising said slider, said handlebar, and said means for restraining said handlebar,
   g) a spring set urging said suspended component upward,
   h) a means for limiting upward travel of said suspended component along said guide set,
   i) an isolator set of at least one isolator, between said suspended component and non suspended component.

11. The shock and vibration damping handlebar mount assembly of claim 10 wherein said guided surface has added clearance along said guide set plane.

12. The shock and vibration damping handlebar mount assembly of claim 10 further including a slider cross support connecting at least two (of) said sliders.

13. The shock and vibration damping handlebar mount assembly of claim 10 wherein said housing set is integral.

14. The shock and vibration damping handlebar mount assembly of claim 10 wherein said housing set is integral to said vehicle's steering mechanism.

15. The shock and vibration damping handlebar mount assembly of claim 10 further including a housing cross support wherein at least two said housings of said housing set is connected by said housing cross support.

16. The shock and vibration damping handlebar mount assembly of claim 10 wherein said means for limiting upward travel comprising a means for adjustably urging said suspended component downward.

17. A method for damping shock by handlebar mount assemblies for vehicles utilizing handlebar assisted steering mechanisms, comprising the steps of:
   a) providing a guide set of at least one guide with predetermined beneficial path;
   b) providing a slider set of at least one slider, said slider set having a slider guided surface, an aperture configured to receive a handlebar, and
   c) providing a means for restraining said handlebar within said aperture;
   d) providing a suspended component, comprising, said slider, said handlebar, and said means for restraining said handlebar;
   e) providing a means for urging said suspended component upward from a housing set of at least one housing;
   f) providing a plane offset distance in proportion to said slider guided surface engagement length along said guide, whereby torque observed by said handlebar and said guide set is nonrestrictive to desired travel of said slider along said guide set.

18. The method of claim 17 wherein said plane offset distance is less than two times the sum of the length of said slider guided surface engagement length minus the width of said guide, plus one half the length of said guided slider surface engagement length.

* * * * *